R. C. LORD.
PROCESS OF MAKING MAGNESIUM CHLORID.
APPLICATION FILED OCT. 15, 1915.
1,197,512.
Patented Sept. 5, 1916.
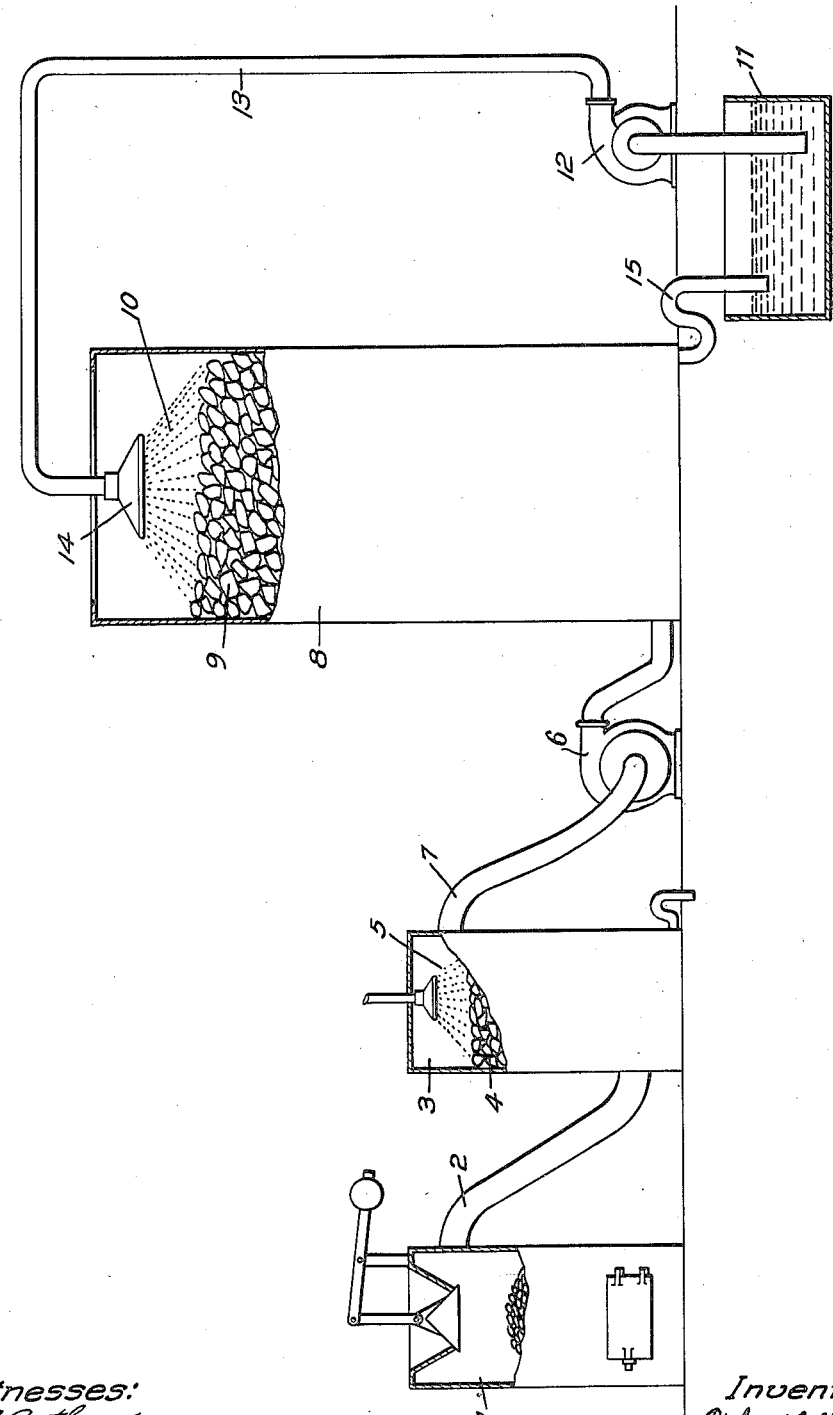
Witnesses:
F. E. Arthur.
H. Thornton Bogert
Inventor
Richard Collins Lord
By
Walter E. Murray
Attorney.

UNITED STATES PATENT OFFICE.

RICHARD COLLINS LORD, OF CINCINNATI, OHIO.

PROCESS OF MAKING MAGNESIUM CHLORID.

1,197,512.  Specification of Letters Patent.  Patented Sept. 5, 1916.

Application filed October 15, 1915. Serial No. 56,148.

*To all whom it may concern:*

Be it known that I, RICHARD COLLINS LORD, a citizen of the United States of America, and resident of Cincinnati, county of Hamilton, and State of Ohio, have invented a certain new and useful Process of Making Magnesium Chlorid, of which the following is a specification.

This invention relates to those processes of making magnesium chlorid which are based upon the reaction which takes place when a solution of magnesium oxid and calcium chlorid are treated with carbon dioxid. The reaction which is sought, is the formation of calcium carbonate and magnesium chlorid. However, in many instances, instead of getting this reaction, frequently magnesium carbonate is formed.

It is the object of my invention to provide a process whereby pure magnesium chlorid may be produced.

I have discovered that by using a gas in which the carbon dioxid is less than thirty per cent., that the formation of magnesium carbonate is prevented and a pure magnesium chlorid is produced. A gas having the proper proportions of carbon dioxid is formed by the combustion, in air, of coke, charcoal, anthracite coal, or other form of carbon, with which magnesite, dolomite or limestone may be mixed.

The magnesium oxid may be obtained by calcining magnesite or dolomite, or by precipitation from a solution containing a soluble magnesium salt by lime or an alkali. If obtained by calcination, the magnesium oxid must not be dead-burned, but must be an absorbent of $CO_2$ from a gas in which the partial pressure of the $CO_2$ is less than 150 mm. (of mercury). I prefer to obtain the magnesium oxid in the form of magnesium hydroxid produced by precipitation from a solution containing magnesium chlorid with lime, and subsequent separation from the calcium chlorid solution formed by filtration or sedimentation. The magnesium hydroxid thus obtained contains all the impurities originally in the lime, as well as any magnesium oxid which the lime originally contained.

The bitter waters formed in the manufacture of salt from brines, such as occur in the State of Michigan and in the southeastern part of the State of Ohio, may be used as the solution containing magnesium chlorid.

In the figure, I have illustrated an apparatus, which may be used in carrying out my process.

The gas containing the proper proportion of carbon dioxid is formed by the combustion of coke or coal in furnace 1, and is led thence, through pipe 2, to the bottom of cooling tower 3. This cooling tower is filled with crushed lime stone, or other broken filler 4, upon the top of which a spray of water 5 is discharged. The gas passes up through the broken filler and is washed and cooled by the water, thence is drawn by pump 6 through pipe 7 and forced into the bottom of a gas scrubber 8, which is filled with lumps of non-porous material 9, upon the top of which the solution of magnesium oxid and calcium chlorid is discharged in the form of a spray 10, and flows down through the interstices between the lumps 9 and comes into intimate contact with the gas containing the carbon dioxid. The solution of calcium chlorid in which magnesium oxid or magnesium hydroxid is suspended, is contained in tank 11, is drawn thence by pump 12 through pipe 13, and discharged through the sprayer 14. The calcium carbonate resulting from the reaction being insoluble, will accumulate in scrubber 8 and the magnesium chlorid solution will be discharged through pipe 15 into tank 11. The fundamental reaction which takes place in the scrubber, is as follows:

$$MgO + CaCl_2 + CO_2 = CaCO_3 + MgCl_2 \quad (1)$$

In carrying out of the above fundamental reaction, the two secondary reactions involving an element of time are as follows:

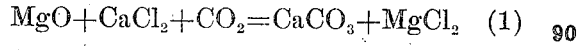

$$CO_2 \text{ (gas)} + H_2O = \overset{+}{H_2}\overset{-}{CO_3} \quad (2)$$

$$\overset{+}{Mg}(OH)_2 + \overset{+}{H_2}\overset{-}{CO_3} = \overset{+}{Mg}\overset{-}{CO_3} + 2H_2O \quad (3)$$

The third secondary reaction is almost instantaneous:

$$\overset{+}{Mg}\overset{-}{CO_3} + \overset{+}{Ca}\overset{-}{Cl_2} = \overset{+}{Mg}\overset{-}{Cl_2} + CaCO_3 \quad (4)$$

The positive and negative marks above the chemical symbols indicate a salt in solution, with the nature of the ions which will be formed by its solution. The dissolving of the $CO_2$ contained in the gas, by the solution containing magnesium hydroxid, suspended in a calcium chlorid solution, proceeds at a rate proportional to the percentage or partial pressure of the $CO_2$ in the gas employed. By providing a gas having less than thirty per cent. by volume of carbon dioxid, I prevent reaction 2 from proceeding more rapidly than reaction 3, for if reaction 2 should proceed too rapidly, instead of having reaction 3, the following reaction would proceed:

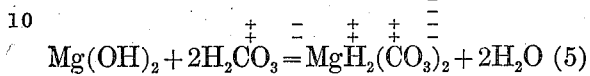

$$Mg(OH)_2 + 2H_2CO_3 = MgH_2(CO_3)_2 + 2H_2O \quad (5)$$

The acid carbonate of magnesium would attack the suspended magnesium hydroxid and precipitate magnesium carbonate. I avoid the precipitation of magnesium carbonate by using a gas containing a partial pressure of $CO_2$ less than atmospheric, and I have found that reactions (1) and (2) proceed at ordinary atmospheric temperatures at about equal rates, as desired, if the partial pressure of the carbon dioxid in the gas utilized is about 150 mm.; that is, the gas contains about 20 per cent. carbon dioxid. If reaction (1) proceeds at a more rapid rate than reaction (2), the fundamental reaction does not proceed according to molecular proportions, and control as to the excess of magnesium hydroxid required is impossible except under very uniform working conditions as to flow of gas, temperature, and concentration. While I obtain the most efficient results under the above gas conditions, I have found that the process can be operated efficiently if a gas containing as high as 30 per cent. of carbon dioxid is employed. At temperatures of from 50° to 80° F. the gas containing $CO_2$ must be in intimate contact with the surface of the liquid containing the suspended magnesium oxid for from five to fifteen minutes, according to the percentage of $CO_2$ in the gas entering the scrubber. Under proper control a gas containing up to 30 per cent. of $CO_2$ on admission into the scrubber will cause the above reaction to proceed quantitatively and to completion with a very low percentage of $CO_2$ in the waste gas passing out of the scrubber.

In the drawing I have shown partial section of one form of absorption or scrubbing tower; but it is to be understood that I do not limit myself to carrying out my process by the use of apparatus of this construction. Two or more carbonating towers may be operated in series instead of one, as shown in my drawing. Instead of using a tower, the absorption may be performed in apparatus similar to the rotary scrubbers employed in gas works.

What I claim is:

1. A process of making magnesium chlorid and precipitated calcium carbonate, which consists in passing gas containing less than thirty per cent. by volume of carbon dioxid through a gas scrubber, the gas while in said scrubber being exposed to a solution of calcium chlorid containing magnesium hydroxid in suspension.

2. A process of making magnesium chlorid which consists in passing a solution of calcium chlorid containing magnesium hydroxid in suspension downward through the interstices between a mass of broken filler and simultaneously passing upward through said interstices a gas containing less than thirty per cent. by volume of carbon dioxid.

In testimony whereof, I have hereunto subscribed my name this 13th day of October, 1915.

RICHARD COLLINS LORD.

Witnesses:
WALTER F. MURRAY,
W. THORNTON BOGERT.